(No Model.)
G. LEE ANDERS.
2 Sheets—Sheet 1.
MAGNETO ELECTRIC MACHINE FOR TELEPHONE SIGNALING.
No. 251,758.
Patented Jan. 3, 1882.
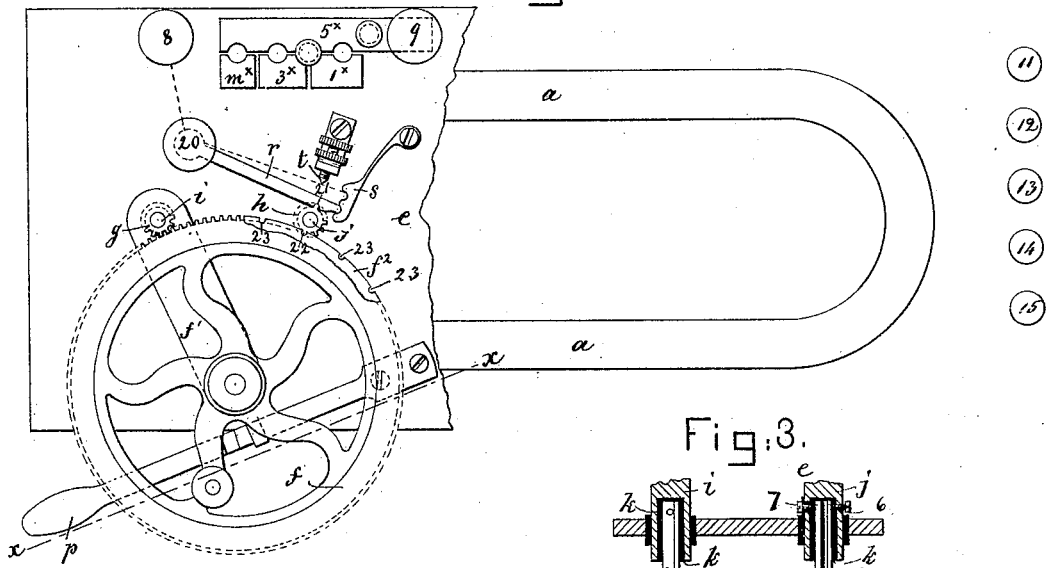
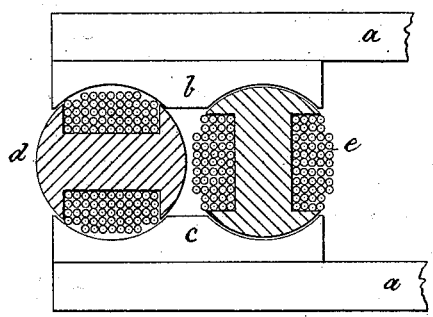
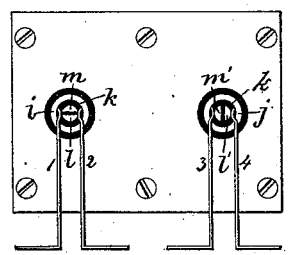
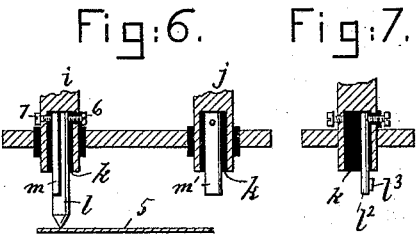
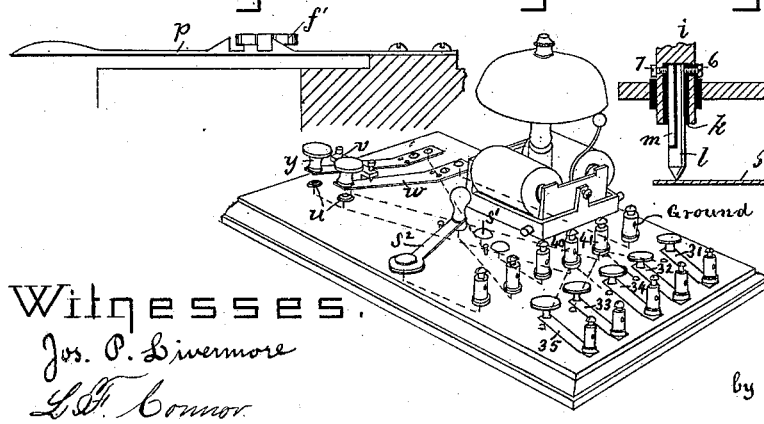
Witnesses.
Jos. P. Livermore
L. F. Connor
Inventor.
George L. Anders
by Crosby Gregory
Attys.

(No Model.) G. LEE ANDERS. 2 Sheets—Sheet 2.
MAGNETO ELECTRIC MACHINE FOR TELEPHONE SIGNALING.
No. 251,758. Patented Jan. 3, 1882.
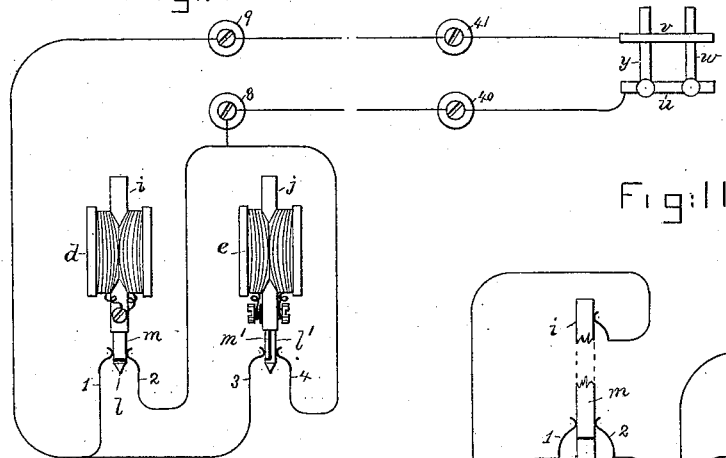
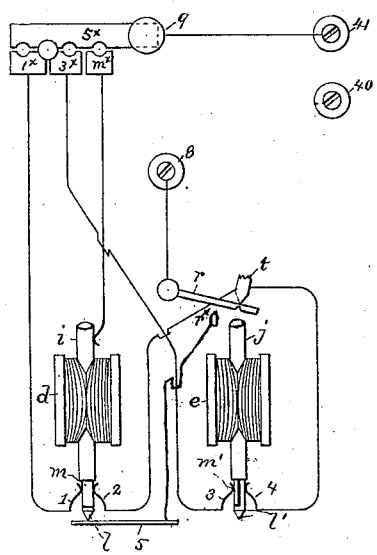
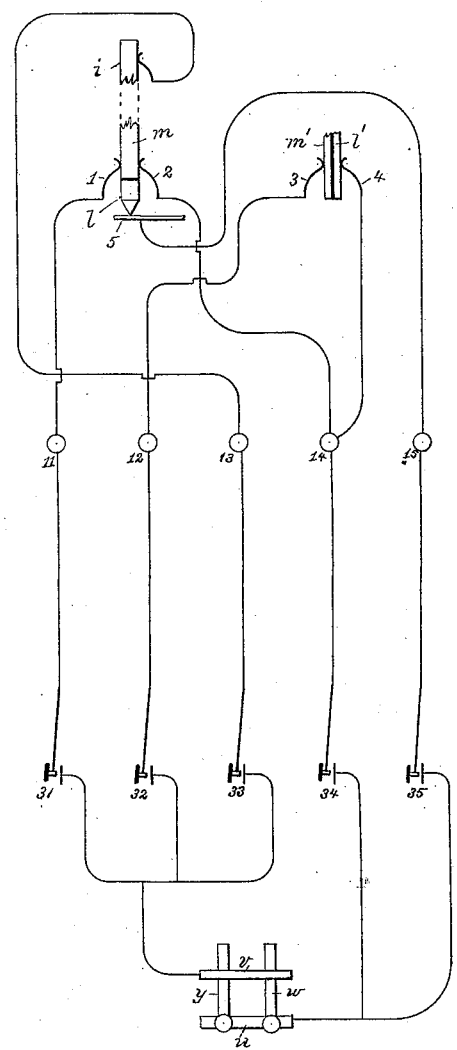
WITNESSES
Jos. P. Livermore
L. F. Connor
INVENTOR
George L. Anders
by Crosby Gregory Attys

UNITED STATES PATENT OFFICE.

GEORGE LEE ANDERS, OF BOSTON, MASSACHUSETTS, ASSIGNOR TO AMERICAN BELL TELEPHONE COMPANY, OF SAME PLACE.

MAGNETO-ELECTRIC MACHINE FOR TELEPHONE-SIGNALING.

SPECIFICATION forming part of Letters Patent No. 251,758, dated January 3, 1882.

Application filed April 12, 1880. (No model.)

*To all whom it may concern:*

Be it known that I, GEORGE LEE ANDERS, of Boston, county of Suffolk, State of Massachusetts, have invented an Improvement in Magneto-Electric Machines for Te'ephone-Signaling, of which the following description, in connection with the accompanying drawings, is a specification.

My invention relates to telephonic signaling, and has for its object to enable all the signaling to be performed by electric currents generated by magneto-electric machines, thus doing away with the galvanic batteries used for that purpose, which are unsteady in action and of great expense to maintain and keep in working order.

Another object of this invention is to produce a magneto-electric machine capable of giving out currents of the various characters needed for signaling as a continuous current of nearly uniform strength and of either polarity, as desired, or a fluctuating current of varying intensity, or a current consisting of a series of waves or impulses of the same polarity, either positive or negative, as desired.

In the smaller magneto-electric machines now in common use—among which the Clarke and Siemens machines may be cited as examples—the currents generated by the rotation of a single armature are of a fluctuating character, alternately varying from a strong positive to a strong negative current, and in some such machines a commutator is used by which the currents are all sent to a line in the same direction, but still of an intensity alternately varying from nothing to a maximum.

In operating the signals of many of the signaling systems now in use—as, for instance, one invented by me on which an application for patent, filed March 11, 1880, is now pending, to which reference may be had—a controlling mechanism is set by a series of electric impulses which have been shown as the steady currents from a galvanic battery, in proper position to allow one bell only of the series to be rung, after which the said bell may be rung by currents of another character, usually the short alternate currents of a common magneto-electric machine, which do not affect the said controlling mechanism, and then the controlling mechanism is further operated by a current of another character, usually a battery-current of the opposite polarity to that before used. Such signaling apparatus may be operated, without the use of galvanic batteries, by a machine constructed in accordance with my invention, which consists, first, in using two armatures so placed that the current produced by one is of minimum while that of the other is of maximum intensity, and in providing suitable commutators therefor to send all such pulsations in one direction, the current formed thereby being of an intensity nearly the maximum of any pulsation, and of sufficient uniformity to produce the effect of a battery-current on an electro-magnet and mechanism controlled thereby.

The invention also consists in providing, in connection with a machine having a single armature, in operation or in circuit, to give fluctuating currents of alternate polarity, a suitable device to send only those of one polarity to line, the intermediate ones being omitted, thus giving a series of waves or impulses of one polarity at short definite intervals; also, in providing, in a machine having two armatures for producing nearly uniform currents, means to throw one of said armatures out of gear when desired to use the machine for fluctuating currents, and then connecting it again in the proper position relative to the other armature; also, in providing, in a machine with a single armature, in operation or in circuit, means to control the currents therefrom, whereby either alternate impulses of opposite polarity or the impulses of one polarity alone, the intermediate ones being omitted, or all the pulsations made to pass in the same direction, may be sent to line, as desired.

The invention also consists in certain details of construction.

The arrangement by which only the separated impulses of the same polarity are transmitted is especially useful in connection with telephone-lines having each two sub-stations and a tap-bell at each station, the bell at one station being operated by positive currents and that at the other by negative currents.

Figure 1 is a plan view of a magneto-electric machine embodying my invention; Fig. 2, a horizontal section thereof, showing the relative position of the two armatures when operating to give steady currents; Fig. 3, a side elevation of the commutating device detached, such as used when one of the armatures is to be thrown out of gear; Fig. 4, a section thereof; Fig. 5, a longitudinal sectional detail on line $x\,x$, Fig. 1; Fig. 6, a modified form of the two commutators as used when the two armatures are to be always rotated, but one to be thrown out of circuit at times; Fig. 7, another modification, to be referred to; and Fig. 8, a view of the operator's table at a central office of a telephone system, showing the connections by which the signals may be operated by magneto-electric currents without the use of galvanic batteries. Figs. 9, 10, and 11 are diagrams illustrating the electrical connections in the apparatus.

The invention is shown embodied in what is known as the Siemens machine; but it can readily be applied to others.

The usual permanent magnet, $a$, is provided with suitable pole-pieces, $b\,c$, between which the armatures $d\,e$, of usual construction, pivoted in suitable bearings, are rotated by the driving-gear $f$, engaging pinions $g\,h$ on the armature-spindles $i\,j$, in the usual manner. The spindle $i$ is in permanent connection at one end with the metal frame or with a suitable contact-plate. The spindle $j$ runs in insulated bearings.

The armatures are placed by causing the pinions $g\,h$ to properly engage the gear $f$, with the direction of their cores about at right angles to one another, as shown in Fig. 2, such arrangement causing the current induced in the coils of one to be of maximum while that in the other is of minimum strength. The currents generated in the coils of the armatures will have their direction or polarity reversed during each revolution thereof, but may be made to pass to line all in one direction by the usual commutators employed for this purpose, such devices being well known. These commutators are shown in Figs. 3 and 4 of an improved construction.

The spindles $i\,j$ of the armatures are bored out at their lower ends and lined with insulating material $k$, into which pivots made of two pieces, $l\,m$ and $l'\,m'$, of metal separated by a strip of insulating material are driven. One of these pieces, $l$, in the spindle $i$ of the armature $d$ of which the currents are always to be used, is entirely insulated from the other and from the metal of the armature and rest of the machine in electrical connection therewith, but is extended down and properly shaped to form a pivot in electrical connection with its step 5. The other metal piece, $m$, is connected, as by the screw 6, (see Fig. 6,) with the armature-spindle $i$ and metallic parts in connection therewith. In the other commutator (shown in Fig. 3) the piece $m'$ is wholly insulated and the one $l'$ connected by screw 7 with the spindle $j$. One end of the armature-coil is connected with the piece $l$ or $l'$ by screw 6 and the other with the piece $m$ or $m'$ by the screw 7, for the purpose of sending the currents in one direction, as before described. These connections would be sufficient if the said pieces were entirely insulated from everything else; but the other connections—namely, with the step 5 and spindle $i$—will be needed to give the other currents, as hereinafter described.

The currents are led away to the line by the usual spring contact-pieces, 1 2 3 4, which make connection with the pieces $l\,m\,l'\,m'$ as they come around in the rotation of the armature, one of the springs of each pair being thus always in connection with an electrode of the coil of one polarity and the other with an electrode of the other polarity. The springs 1 and 3, for instance, may thus always receive positive currents and be connected in any suitable manner to one end of the circuit or line wire, and the other or negative springs, 2 4, may be connected to the other end of the said circuit or ground. The said springs should be properly insulated from the rest of the machine, and the current generated by the rotation of the two armatures and conducted to the line, as described, will be continuous and of nearly uniform strength, and may be sent to line in either direction by a suitable key-board or transmitting-key.

When an independent machine is to be used to produce the steady currents the binding-screw 8, connected with springs 2 4, as hereinafter described, may be also connected to the binding-screw 40 on the central-office operator's table, (see Figs. 8 and 9,) and the screw 9, connected with the springs 1 3, may also be connected with the binding-screw 41, the said screws 40 41 being connected with the anvil $u$ and back strap, $v$, respectively, of the reversing-keys $w\,y$. The key $w$ is connected with a ground-wire and the key $y$ with the contact $s'$ of the switch $s^2$, by which latter connection is made with the switch-board and line. The steady continuous currents thus produced will perform the work which has usually been done by galvanic batteries.

When desired to use short fluctuating currents those generated in the coil of one armature only will be needed, and those from the other coil may be removed by breaking the circuit from one of the springs 3 4 thereof, or by throwing the said armature out of gear with the driving-wheel $f$.

In case the armature is to be thrown out of gear it should be stopped when its poles or rounded ends of the core are most remote from the poles of the magnet—that is, in the position of the one marked $d$, Fig. 2—and when again thrown into gear it should be in the proper relation to the one which remains in gear, as hereinbefore described, and shown in Fig. 2. This may be done quickly and without especial care on the part of the operator by the gear-shifting mechanism shown in Figs. 1 and 5.

The driving-gear $f$ is pivoted in a bearing, $f'$, itself pivoted to oscillate about the shaft $i$ of the armature $d$, to cause the gear $f$ to engage and disengage the pinion $h$, the said gear always remaining in engagement with the pinion $g$. A suitable holder, $p$, is provided to engage the oscillating bearing-arm of the gear $f$ and hold it in either of its positions.

The pinion $h$ and its armature $e$ are stopped and held in the proper position, before described, by the stop-arm $r$, pivoted at 20 and provided with a notch, 21, to engage one of the two teeth 22, projecting on each side of the armature spindle $j$, either above or below the pinion $h$, as most convenient.

In order to insure that the pinion $h$ shall be re-engaged when in the proper position relative to the pinion $g$, a guide-ring, $f^2$, provided with a series of notches, 23, and connected with the gear $f$, bears against the tooth 22 not engaged by the arm $r$ until, when one of the notches 23 comes opposite the said tooth 22, the gear $f$ falls into engagement with the pinion $h$. The notches 23 are so placed that the gear $f$ falls in when the pinion $h$ is in the proper position, and while the said gear is driving the said pinion the teeth 22 successively fall into the notches 23 without interfering with the proper action of the machine. After the gear $f$ has come into engagement with the pinion $h$ the latter is released by throwing back the stop-arm $r$, which is retained in either of its positions by the double-notched spring-arm $s$. When both the pinions are in gear and the machine in operation one commutator-spring of each pair—for instance, the ones marked 2 4—will have to be connected to one end of the line or ground, and, as in this case, the holding-arm $r$ will have to be back, out of engagement with the teeth 22. A convenient method of making the desired connection will be to connect the said springs 2 4 to a stop, $t$, against which the arm $r$ is thrown when disengaged, the said arm itself being connected with the binding-screw 8, and in this case the springs 1 3 may be connected to the plates $1^\times$ $3^\times$, connected by a plug with the plate $5^*$ and binding-screw 9, as shown in Fig. 10, the said screws 8 9 being connected, as before described, to a proper transmitting-key, to send the currents to line, as desired.

When the pinion $h$ is disconnected and armature $e$ thrown out of action, as just described, or if the circuit of the coil of the armature is broken by a suitable key or switch at any point in the circuit, the currents are derived from the armature $d$ alone, so that in either case the said currents and means of controlling them may be the same as if derived from a machine having but one armature, (in fact, it then has but one operative armature,) and will be so described.

When it is desired to use the currents just as generated in the coil (that is, of alternate positive and negative polarity)—as, for example, to oscillate a light polarized armature in a signal apparatus, such as hereinbefore referred to—one end of the coil should be connected with one end of the circuit or line wire and the other end of the coil with the other end of said circuit or ground during the entire rotation of the armature.

The piece $l$ of the commutator, connected with one end of the coil, is, as before described, always in connection with its step 5, and may consequently be connected therefrom with one end of the main circuit, while the other end of the coil is connected with the metal piece $m$, connected, as before described, with the armature-spindle $i$, and consequently through the gear $f$ with the metal bearings and framework of the machine, which may be connected to the other end of said circuit.

As the ends of the coil must not be permanently connected either to line or to ground when the machine is used with both armatures, as before described, to produce steady currents, the step 5 should be connected with a different binding-screw from, or its circuit controlled independently of, that of the springs 2 4 then connected with the ground, and similarly the circuit from the metal of the machine to the line should be separate from that from the springs 1 3.

When the armature $e$ is to be thrown out of action, as before described, the connections for the alternating currents may be made from the step 5 through the arm $r$ by having the latter make contact with a suitable point, as shown at $r^\times$, Fig. 10, when it is moved downward into the position shown in full lines, Fig. 1. The currents will thus find their way from one end of the coil connected with the pivot-piece $l$ through the step 5 and arm $r$ to the screw 8, while from the other end of the coil they pass through the metal of the machine to the plate $m^\times$, which may now be connected by plug with plate $5^*$ and the screw 9, the plates $1^\times$ $3^\times$ being disconnected therefrom.

When it is desired to send to line only the intermittent currents of one polarity generated in the coil it may be done by connecting one end of said coil to one end of the circuit as to the ground and allowing the other end to be connected only during that part of the rotation of the armature in which the current generated is of one polarity, as while one side of the commutator is connected with one of the springs. These currents may also be sent by leaving the connections as last described, the pivot $l$ connected to the binding-screw 8, and the machine or plate $m^\times$ to the one 9, and also connecting the plate $1^\times$ and spring 1 to line.

Then during a half-rotation the pivot piece $l$ will be connected to the screw 8 and the other piece, $m$, to the one 9, (both through the spring 1 and metal of the machine,) and the proper current will be sent from said screws to an exterior circuit connected therewith, but during the other half-rotation the pivot-piece $l$ will be connected to the screw 9 by the spring 1, and the other piece, $m$, also connected to the same screw, so that the current will be shunted from the line, passing only through the circuit connecting the said spring 1 and the metal of the machine to the screw 9.

It is obvious that the intermittent currents would also be produced by connecting the pivot l and the spring 1 alone in circuit, the metal of the machine being disconnected therefrom.

If it should be desired to send all the currents induced by the one armature, d, in one and the same direction, the spring 1 should be connected to one and the spring 2 to the other end of the circuit, the metal of the machine and step 5 being disconnected, such an arrangement requiring some alterations in the connection of the arm r or step 5, and other parts which need not be described, as they could be readily made, and in practice this sort of current will rarely be used.

In practice the machine will generally be used with both armatures in operation without disengaging either of the pinions g h, and the currents therefrom will be controlled by suitable keys, such keys and their connections with the instruments of the operator's table at a central office of a telephone system being shown in Fig. 8. When intended to be used in this way with both armatures in operation the holder p and the arms r s and contact-point t will be omitted. The commutators will be constructed and their pieces connected with the coils as before, except that the step 5 of the armature d will not be connected with the other armature, e. In other words, the metal pieces l' m' of the commutator of the armature e, the currents of which are to be used only when steady currents are desired, may be entirely insulated from everything except the ends of the coil and the springs 3 4. The connections of the commutator of the armature d will be as before described.

A series of binding-screws are shown on the right hand of Fig. 1, which are connected as follows, (see Fig. 11:) the one marked 11 with the spring 1, 12 with 3, 13 with the metal of the machine in connection, as before described, with the piece m, 14 with springs 2 and 4, and 15 with step 5.

The machine may be kept at any desired place and the said screw-cups 11 12 13 14 15 connected with a series of normally-open keys, 31 32 33 34 35, respectively, at a suitable point on the operator's table, the ones 31 32 33 being adapted to form connection, when closed, with the back contact-strap, v, of the reversing-keys w y, and the ones 34 35 with the anvil u thereof. By depressing keys 31, 32, and 34 the steady currents are sent to the reversing-keys w y, and may be sent thereby to a line in either direction, as desired, in usual manner. It will be seen that by this operation the springs 1 3, screws 11 12, and keys 31 32 are connected to the back strap, v, and the springs 2 4, screw 14, and key 34 to the anvil u of the said key. By depressing keys 33 and 35 the screw 13 and metal of the machine and piece m are connected to the back strap, v, and the screw 15, step 5 and pivot-piece l to the anvil u, and the short alternately-reversing currents are sent, the coil of armature e being in open circuit. As these—namely, the steady and the short reversing currents—will be most commonly used and are the only ones needed to operate the individual signal-bell, before referred to, it will be advantageous to so locate and connect the keys that the ones 31, 32, and 34 and the ones 33 and 35 may be simultaneously operated by depressing a suitable key or lever connected therewith. By depressing keys 31 and 35 the spring 1 and step 5 are brought into circuit and the intermittent currents of one polarity may be sent, and by depressing keys 31 34 the springs 1 and 2 are brought into circuit and all the currents of the one armature d are sent in the same direction.

When desired to produce only the short intermittent currents of the same polarity a convenient form of commutator is as shown in Fig. 7, one end of the coil being connected to the metal of the machine, or otherwise adapted to be in permanent connection with one end of the circuit, and the other end of the coil with an eccentric-pin, $l^2$, adapted to come into contact with a spring, $l^3$, during a portion of the rotation of the armature, when the strongest currents of one polarity are produced. By using two such springs, one on each side of the axis of the armature, the currents of one polarity may be sent by connecting one of the said springs in circuit and those of the other polarity by connecting the other spring; or, by connecting both to one end of the circuit, the usual alternate reversing-currents will be sent.

It will be readily understood that while the direction of the currents in the main circuit has been herein described as controlled by a reversing-key, it may be controlled by reversing the direction of rotation of the machine.

I claim—

1. In a magneto-electric machine, the inductive armatures relatively arranged as described, so that the current generated in one armature is strongest when it is weakest in the other, and combined with commutators for carrying off the currents in the same direction, and conductors for carrying the current from each armature directly to line without passing through the other, substantially as described.

2. The combination, with the same magnet, of inductive armatures mounted on separate shafts and arranged so that their poles alternate in approaching the poles of the magnet, and combined with gearing for revolving them, and commutators and conductors for carrying off the currents generated in both armatures into one circuit, substantially as described.

3. In a magneto-electric machine, an armature and coil therefor in which alternately positive and negative currents may be induced, in combination with conductors and contact devices connected, as explained, with said coil and with the exterior-circuit, so that only the immediate currents of one polarity are sent to the exterior circuit, substantially as described.

4. The combination, with a permanent magnet and an inductive armature therefor having its coil in continual connection with one end of an exterior circuit, of a commutator-piece connected with the other end of the coil, and a spring or contact-piece connected with the other end of the exterior circuit, said spring being arranged, as explained, so as intermittently to make contact with said commutator-piece, substantially as described.

5. The combination, with the induction-coil of a magneto-electric machine in which alternating currents of opposite polarity are generated, of a commutating device having contact-pieces which are in connection with one end of the coil while the current therein is of one and with the other end thereof when it is of the other polarity, and contact-pieces which are continuously in connection one with one and the other with the other end of said coil, and means, as described, to connect any of said contact-pieces in circuit independently of the others, whereby currents of alternating polarity, or separated or consecutive currents of the same polarity, may be transmitted to an exterior circuit, as desired, by making the proper connection, substantially as and for the purpose specified.

6. A magneto-electric machine with inductive armatures arranged, as described, so that the maximum and minimum currents are generated in the coils of said armatures not simultaneously but successively, and means, as set forth, to connect the ends of said coils continuously or alternately with an exterior circuit, whereby currents of various character—as steady or fluctuating or separated—may be transmitted to the exterior circuit, as desired, substantially as described.

7. In a magneto-electric machine, a magnet and two armatures and a driving mechanism to rotate them near the poles of the said magnet to generate electric currents, combined with means, as set forth, to disengage one of the said armatures from the driving mechanism and hold it with its poles remote from those of the magnet, as and for the purpose described.

8. In a magneto-machine, two armatures and a driving mechanism to rotate them in fixed relation to one another, combined with means, as described, to disengage one of the said armatures from the driving mechanism, and then cause it to be re-engaged in the required positive relation to the other, as and for the purpose set forth.

9. In a magneto-electric machine, the combination, with the spindle of the rotary armature bored and lined with insulating material, as described, of a metal pin split longitudinally, and having its two parts thus divided separated by a layer of insulating material and fitted within the said bored spindle, substantially as described.

10. In combination with an inductive armature wrapped with insulated wire, a rotary commutator consisting of two metal pieces insulated from one another and adapted to come alternately in contact with suitable contact-springs in their rotation, one of the said metal pieces being in contact with an independent contact-piece during its entire rotation, and both of them being connected with the ends of the armature-coils, as and for the purpose specified.

11. The combination, with the armature of a magneto-electric machine and the coils of said armature, of contact-pieces for taking off the currents of alternately-opposite polarities as generated in the said coils, contact-pieces for taking off currents of one polarity only, and means, as indicated, for connecting in with an electric circuit either set of contact-pieces, substantially as described.

12. A magneto-electric machine provided with contact-pieces connected with its induction-coils, and a series of independent open keys connected with the said contact-pieces, and a reversing-key connected with the anvils of said keys to enable the character of the current to be controlled by properly operating the independent keys, and the said currents of proper character to be sent to line in either direction, as desired, by the reversing-key, substantially as described.

In testimony whereof I have signed my name to this specification in the presence of two subscribing witnesses.

GEORGE LEE ANDERS.

Witnesses:
   Jos. P. LIVERMORE,
   N. E. C. WHITNEY.